United States Patent [19]

Ohyama et al.

[11] Patent Number: 5,294,976
[45] Date of Patent: Mar. 15, 1994

[54] IMAGE PICKUP SYSTEM FOR REPRODUCING IMAGE DATA USING SENSITIVITY FUNCTION

[75] Inventors: Nagaaki Ohyama, Yokohama; Yasuhiro Komiya, Hachioji, both of Japan

[73] Assignee: Olympus Optical Co., Ltd., Tokyo, Japan

[21] Appl. No.: 37,094

[22] Filed: Mar. 25, 1993

[30] Foreign Application Priority Data

Apr. 28, 1992 [JP] Japan ................................. 4-136183
Mar. 8, 1993 [JP] Japan ................................. 5-46751

[51] Int. Cl.$^5$ ............................................. H04N 9/04
[52] U.S. Cl. ..................................... 348/229; 348/270
[58] Field of Search ............................... 358/41–44, 358/209, 213.18, 227, 228, 909, 906, 21 R, 160, 475, 471; 382/17, 61; H04N 9/04, 5/30

[56] References Cited

U.S. PATENT DOCUMENTS

| | | | |
|---|---|---|---|
| 3,595,990 | 7/1971 | Washburn | 358/43 |
| 4,622,584 | 11/1986 | Nagasaki | 358/44 |
| 4,870,493 | 9/1989 | Izawa | 358/228 |
| 4,922,334 | 5/1990 | Hashimoto | 358/44 |
| 5,040,068 | 8/1991 | Parulski | 358/209 |

OTHER PUBLICATIONS

Fundamentals of Digital Image Processing; A. Jain; Prentice-Hall International Editions; pp. 275-277 & 299-304.

Primary Examiner—James J. Groody
Assistant Examiner—Sherrie Hsia
Attorney, Agent, or Firm—Frishauf, Holtz, Goodman & Woodward

[57] ABSTRACT

In a sensitivity function measuring unit, a CMD for picking up a beam from a light source is arranged through a photographic lens and a liquid crystal lens. A preamplifier, an A/D converter, a subtractor, a sensitivity function memory, a compressor, and R, G, and B sensitivity function memories are sequentially connected to the CMD through a switching circuit. An image reproducing unit for reproducing an original image using a sensitivity function calculated by the sensitivity function measuring unit is connected to a calculator for calculating a reproduced image, a frame memory for storing an image signal picked up by the CMD, and calculators for calculating sensitivity functions stored in the sensitivity function memories. The image reproducing unit is also connected to a display unit.

5 Claims, 14 Drawing Sheets

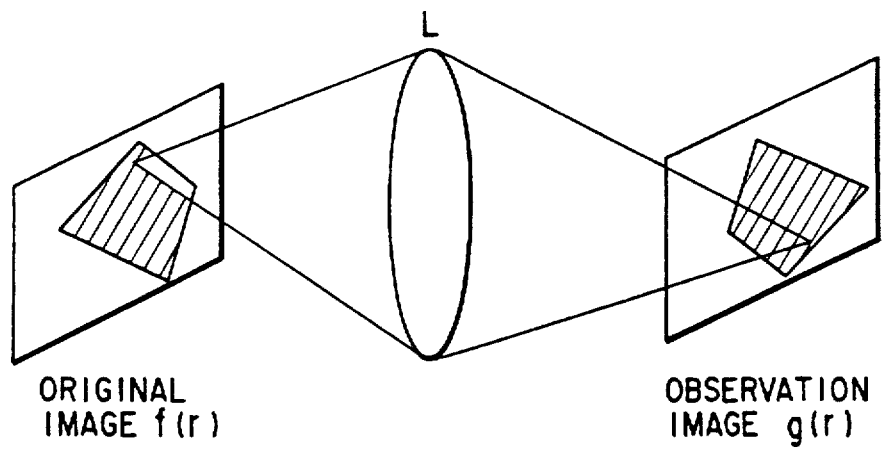
F I G. 3A
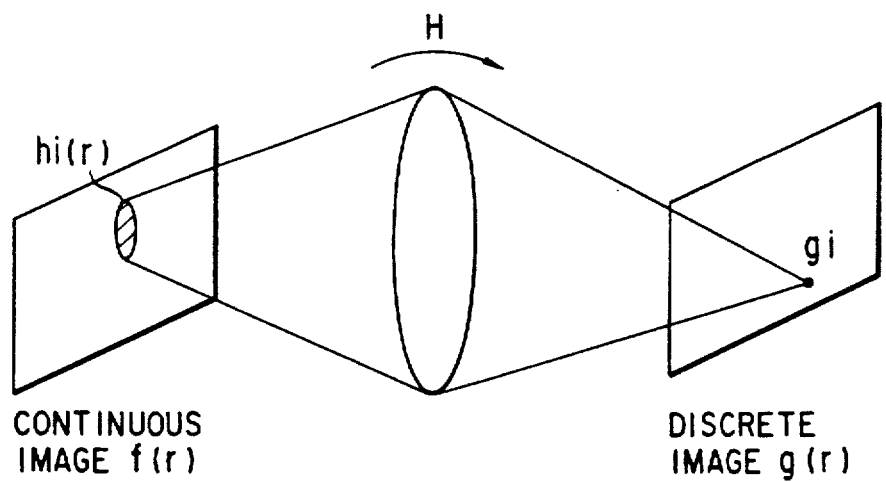
F I G. 3B

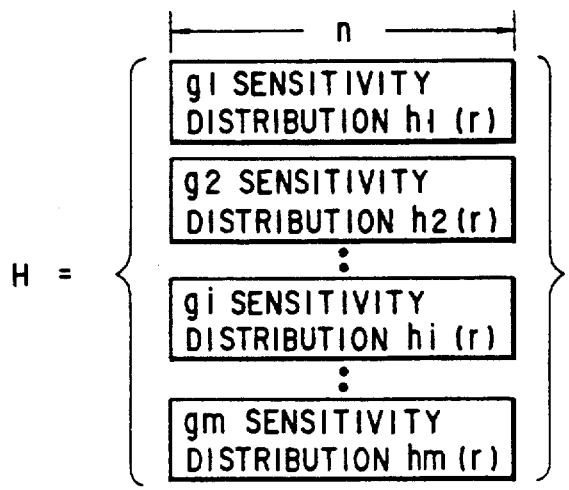
F I G. 4
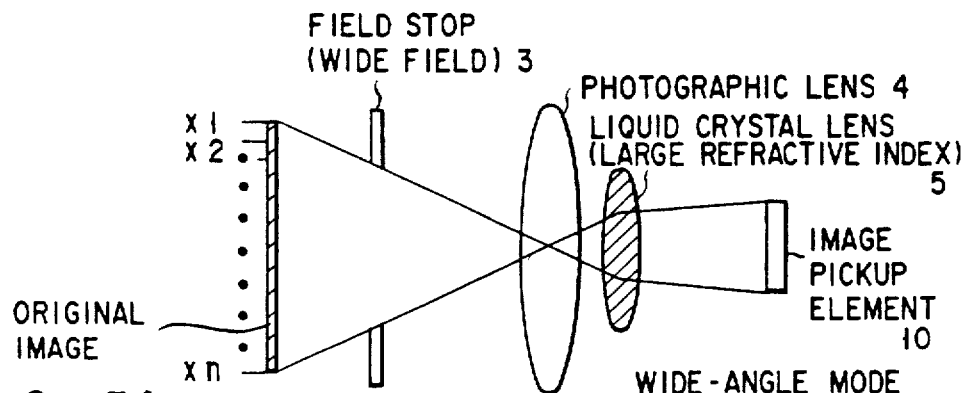
F I G. 5A
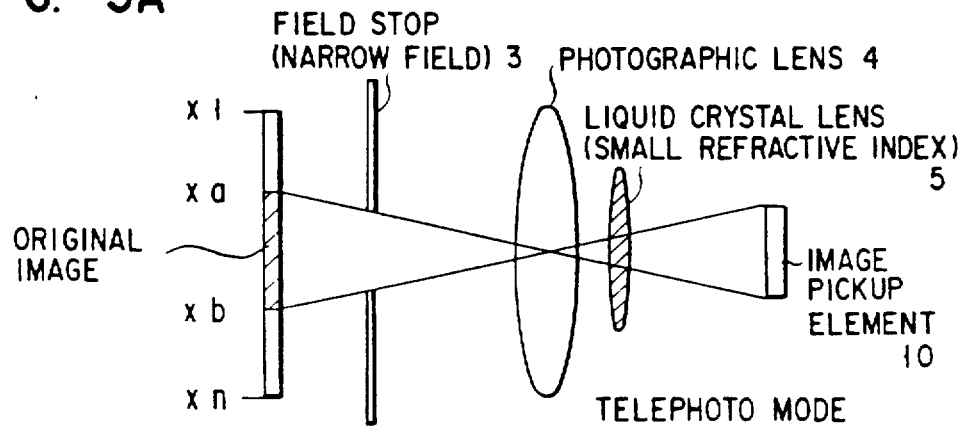
F I G. 5B

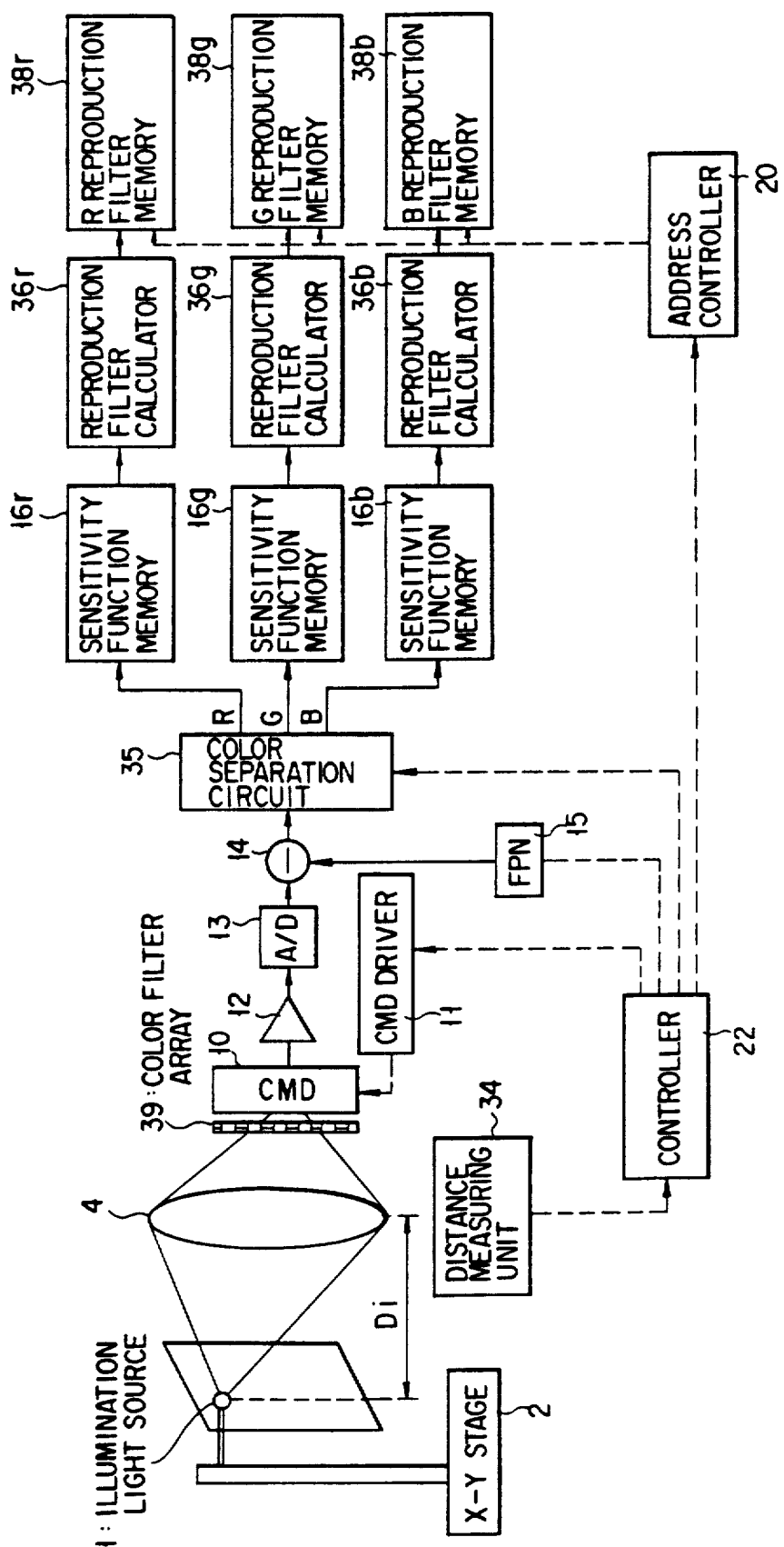
F I G. 8

39: COLOR FILTER ARRAY

36: PEPRODUCING FILTER CALCULATOR

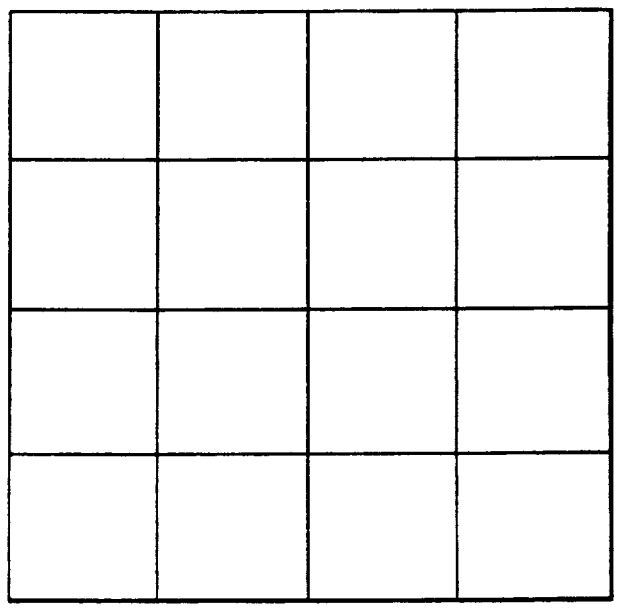
F I G. 13 A
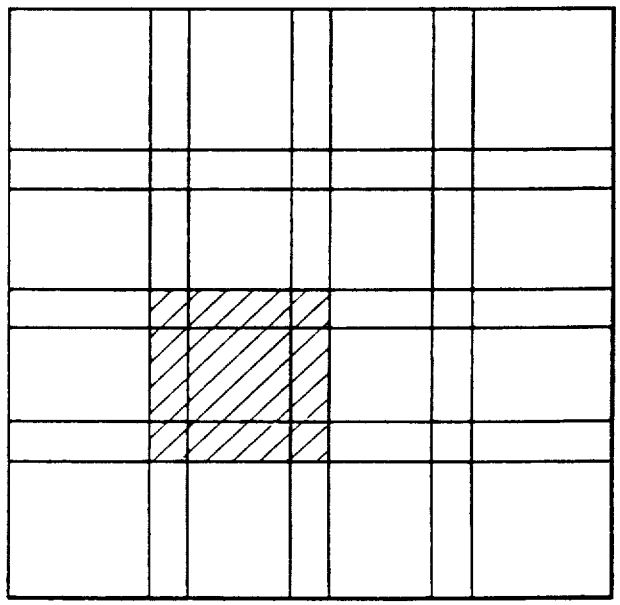
F I G. 13 B

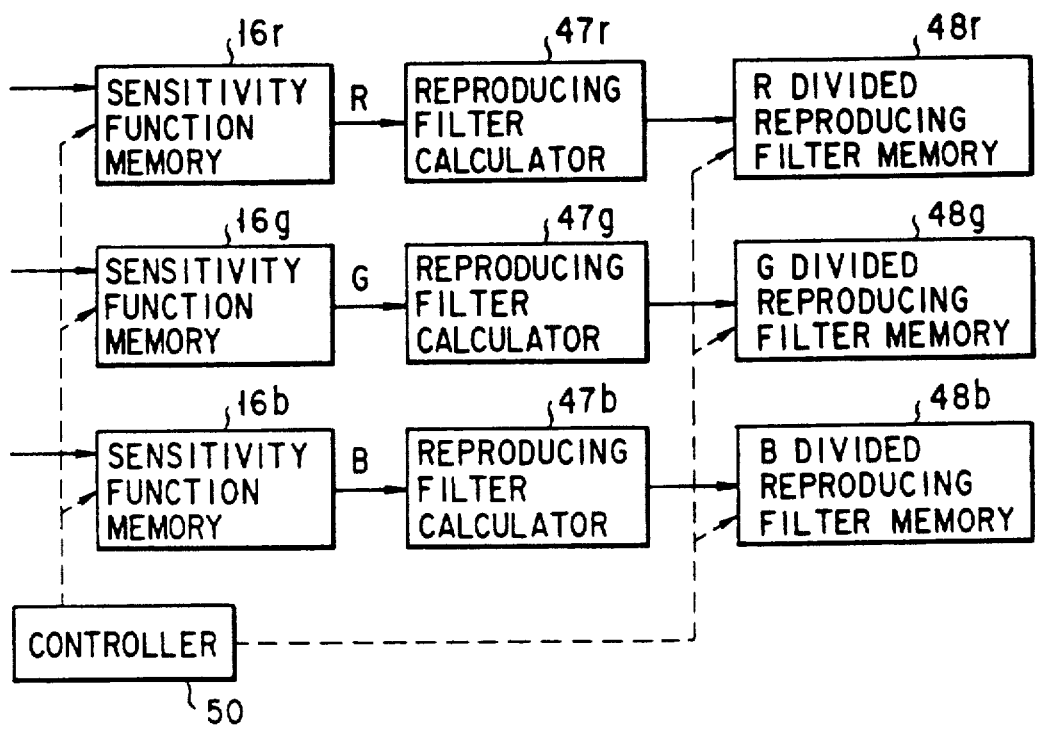
F I G. 14

IMAGE PICKUP SYSTEM FOR REPRODUCING IMAGE DATA USING SENSITIVITY FUNCTION

BACKGROUND OF THE INVENTION

Field of the Invention

The present invention generally relates to an image pickup system and, more particularly, to an image pickup system having an image reproducing means for correctly reproducing degraded image data in, e.g., an image pickup system such as an electronic still camera for picking an original image to reproduce the original image.

Description of the Related Art

As is known, in an imaging system such as an electronic still camera using an optical system, as shown in FIG. 3A, an original image f(r) (r represents a position) is formed on an image pickup element (not shown) through an optical system L as an observation image g(r).

In this case, when the Fourier spectrum of the original image f(r) is represented by F($\omega$), and the Fourier spectrum of the observation image g(r) is represented by G($\omega$), the following equation can be obtained:

$$G(\omega) = H(\omega) \times F(\omega) \qquad (1)$$

(where $\omega$: spatial frequency)

In equation (1), H($\omega$) is called an OTF (Optical Transfer Function), and is used for representing image forming characteristics of an imaging system.

In addition, when H($\omega$) is subjected to inverse Fourier transformation, a PSF (Point Spread Function) is obtained.

In order to cause the observation image g(r) to coincide with the original image f(r), H($\omega$) = 1 must be satisfied for all spatial frequencies $\omega$.

However, in a practical optical system, H($\omega$) < 1 is satisfied, and a degraded image is formed.

A method using an inverse filter is known as a method of reproducing an original image from an observation image.

The inverse filter is described in detail in, e.g., "Fundamentals of Digital Image Processing", ANIL K. JAIN, pp. 275 to 277, Prentice-Hall International Editions.

According to this literature, as a reproducing filter, the following equation is given:

$$H^-(\omega) = 1/H(\omega) \qquad (2)$$

However, since this filter is represented by the reciprocal number of H($\omega$), when H($\omega$) = 0 is satisfied, H$^-$($\omega$) is diverged. Therefore, the following equations are defined:

$$H^-(\omega) = 1/H(\omega) \text{ (when } H(\omega) \neq 0) \qquad (3)$$

$$H^-(\omega) = 0 \text{ (when } H(\omega) = 0) \qquad (3')$$

In a reproducing filter represented by equations (2), (3), and (3'), an intensity distribution of the image of an optical system must be uniformed at any position of the image, i.e., PSFs in the image must be equal to each other (space-invariant).

However, in a practical optical system, since the PSFs are changed in accordance with their positions due to various aberrations, failure in focusing, or the like, the original image cannot be correctly reproduced by the reproducing filter represented by equations (2) and (3).

In this case, after the PSFs which are changed in accordance with their positions are correctly measured, the reproducing filter represented by equations (2) and (3) may be used. However, sampling of the PSFs performed prior to the measuring of the PSFs is posed as a problem.

That is, although an image on an observation image plane is defined as a continuous image, the image is separated into pixels in an image pickup element or the like, and the image is discretely sampled. Therefore, the PSFs cannot be correctly measured.

For this reason, it is essentially impossible to correctly reproduce an original image by a conventional reproducing filter.

SUMMARY OF THE INVENTION

It is, therefore, an object of the present invention to provide a new and improved image pickup system which can correctly reproduce an original image without being influenced by an optical system even when a continuous system and a discrete system are used.

According to the present invention, there is provided an image pickup apparatus comprising:

a photographic optical system directed to an object to be photographed;

image pickup means for outputting image data corresponding to an image of the object which is incident through the photographic optical system;

sensitivity function storing means for prestoring sensitivity function data representing a light sensitivity in an object space at each pexel included in the image pickup means; and image reproducing means for reproducing the image data output from the image pickup means using the sensitivity function data stored in the sensitivity function storing means.

Additional objects and advantages of the invention will be set fourth in the description which follows, and in part will be obvious from the description, or may be learned by practice of the invention. The objects and advantages of the invention ma be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3A and 3B are views for explaining sensitivity functions of the present invention;

FIG. 4 shows sensitivity functions of the present invention;

FIGS. 5A and 5B are views showing a field angle setting mechanism according to the present invention;

FIG. 8 is a view showing an arrangement for forming sensitivity functions and a reproducing filter in the second embodiment of the present invention;

FIGS. 13A and 13B are views for illustrating the shapes of divided screens according to the fourth embodiment of the present invention;

FIG. 14 is a view showing the arrangement of a main part of a reproducing filter calculating circuit for each divided area.

DETAILED DESCRIPTION OF THE PREFERRED EMBODIMENTS

Figure 1:
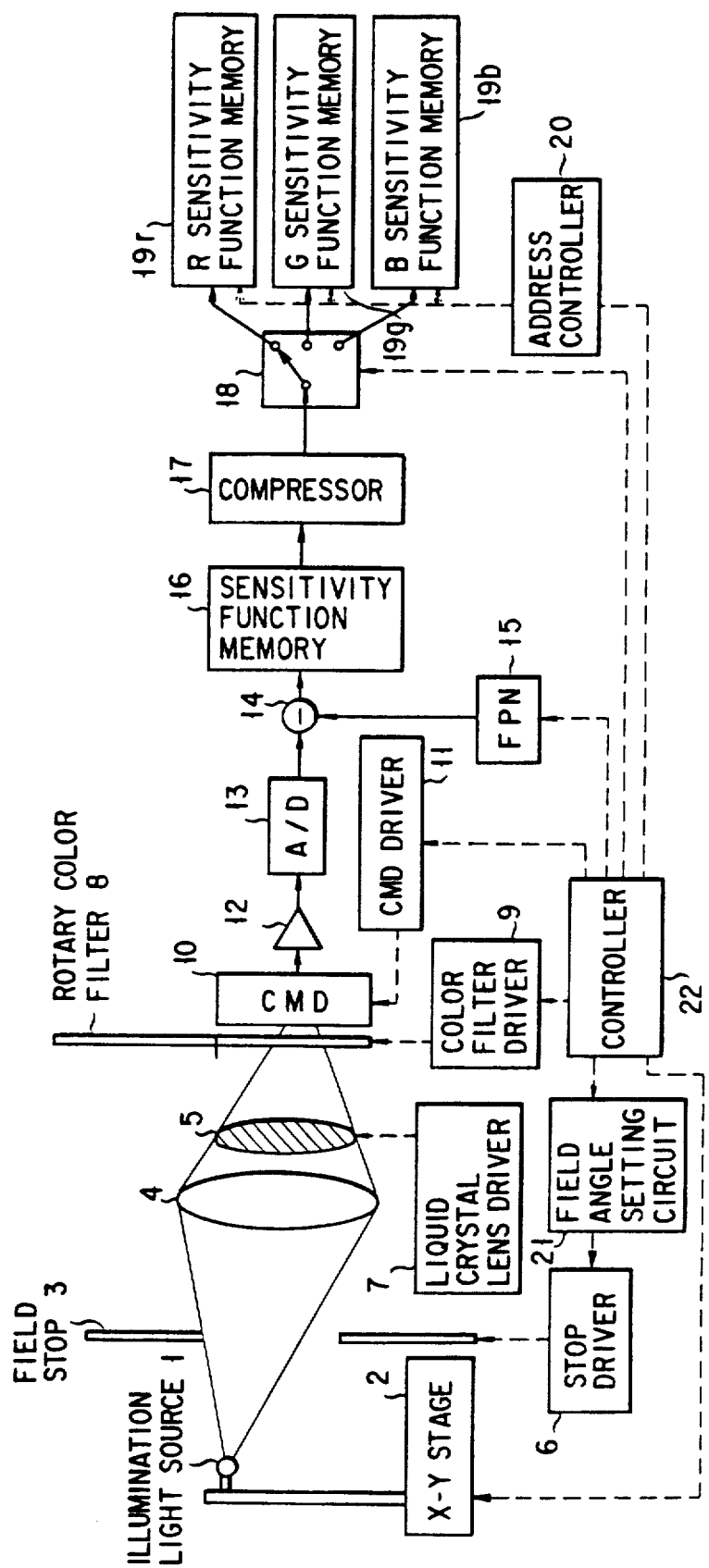
FIG. 1 is a view showing the arrangement of a sensitivity function measuring means used in the first embodiment of the present invention

Reference will now be made in detail to the presently preferred embodiments of the invention as illustrated in the accompanying drawings, in which like reference characters designate like or corresponding parts throughout the several drawings.

Prior to a description of the embodiments of the present invention, a method of reproducing an original image using sensitivity functions serving as the principle of the present invention will be described below.

An original image f(r) which is a continuous image shown in FIG. 3A is formed by an optical system L, and an observation image g(r) serving as a discrete image is picked up by an image pickup element (not shown) placed on the image formation plane. In this case, a sensitivity function storing means and an image reproducing means for reproducing the original image by a sensitivity function stored in the sensitivity function storing means will be considered.

In an image pickup operation by the image pickup element, as shown in FIG. 3B, the observation image g(r) is regarded as a discrete image and can be modeled as the following equation:

$$gi = \int f(r) \times hi(r) dr \quad (4)$$

In equation (4), hi(r) is a function representing a sensitivity distribution contributing to the ith pixel of the observation image g(r), and all pixels are expressed as the following equation:

$$g(r) = H\{f(r)\} \quad (5)$$

In equation (5), H is regarded as a transformation operator from a continuous image to a discrete image, and is called a sensitivity function.

The original image f(r) serving as a continuous image is defined by a continuous system, so that an infinite number of points are present in the range of the observation image. Therefore, an infinite number of basic vectors in an object space are given.

For this reason, the number of columns of the sensitivity function H is infinite, and the sensitivity function itself cannot be defined.

A transposed matrix $H^T$ of H is defined as a transformation operator from a discrete system to a continuous system, and $HH^T$ is considered. That is, assuming that the number of pixels of the image pickup element is, e.g., m, $HH^T$ is defined as an m×m matrix, an inverse matrix can be obtained. A reproduced image fe(r) can be obtained by the following equation:

$$fe(r) = H_S{}^T (HH^T)^+ g(r) \quad (6)$$

In equation (6), + represents pseudo inverse, i.e., a pseudo inverse matrix.

In addition, when each element of $HH^T$ is represented by aij, the following equation is obtained:

$$aij = \int hi(r) \times hj(r) dr \quad (7)$$

$(HH^T)^+$ can be calculated by various methods. For example, $(HH^T)$ can be calculated by an SVD analysis.

The SVD stands for Singular Value Decomposition. The SVD is used in compression of image data and in an analysis of characteristics of a linear system, and is described in the above literature, pp. 176 to 180.

When noise is generated, $HH^T + cI$ (c is a constant, and I is a unit matrix) may be used in place of $HH^T$ in equation (6).

In addition, since a position r of an original image can be arbitrarily set in equation (6), it means that an image signal at any position on the original image can be obtained independently of the pixel count $\underline{m}$ of the image pickup element.

That is, as an image in an arbitrary area can be picked up in accordance with the pixel count $\underline{m}$, electronic zooming can be performed without performing interpolatory calculation.

In this case, $H_S{}^T$ can be understood as transformation for representing a reproduced image, the suffix $\underline{s}$ represents the number of display pixels, and $H_S{}^T$ is represented by an s×m matrix.

As described above, the sensitivity functions H are measured by a sensitivity function measuring means in place of measurement of PSFs in calculation, and an observation image defined as a discrete image is reproduced as a continuous image continuous like an original image by an image reproducing means using equation (6).

The sensitivity function measuring means will be described with reference to FIG. 1 showing an arrangement thereof. Although a two-dimensional image is processed in practice, the image is represented as an one-dimensional image for descriptive convenience.

That is, in FIG. 1, an illumination light source 1 is arranged such that a beam emitted from a point light source is picked up by a CMD 10 through a field stop 3 and a photographic lens 4.

The illumination light source 1 is fixed on an X-Y stage 2 moved within a plane perpendicular to the optical axis of the photographic lens 4.

In order to change the optical path of the beam passing through the photographic lens 4, a liquid crystal lens 5 is vertically arranged to the photographic lens 4.

In this case, the field stop 3 and the liquid crystal lens 5 are connected to a field angle setting circuit 21 for driving a stop driver 6 and a liquid crystal lens driver 7 for controlling the field stop 3 and the liquid crystal lens 5, respectively.

The beam passing through the liquid crystal lens 5 is focused on the charge modulation device (to be referred to as a CMD hereinafter) 10 serving as an image pickup element through a rotary color filter 8 connected to a color filter driver 9.

A preamplifier 12 and an analog/digital (A/D) converter 13 are connected to the CMD 10.

In addition, the A/D converter 13 and a memory (to be referred to as an FPN memory hereinafter) 15 in which the fixed pattern noise of the CMD 10 is stored in advance are connected to the two input terminals of a subtractor 14, respectively.

A memory 16 (to be referred to as a sensitivity function memory hereinafter, because the memory 16 is to store especially sensitivity functions) for storing data obtained by an image pickup operation is connected to the output terminal of the subtractor 14.

In this case, although the number of columns of sensitivity function H is originally infinite, measurement of the sensitivity function H cannot be impossible, so that the number of the columns is set to be finite (n), and the sensitivity functions are stored in the memory in the form of an m×n matrix as shown in FIG. 4.

Each of the rows stores a sensitivity distribution $h_i(r)$ of a corresponding one of pixels $\underline{i}$.

A switching circuit 18 for performing a switching operation between a red (R) sensitivity function memory 19r, a green (G) sensitivity function memory 19g, and a (B) blue sensitivity function memory 19b for three primary colors (RGB) is connected to the output terminal of the sensitivity function memory 16 through a data compressor 17.

An address controller 20 is connected to the R sensitivity function memory 19r, the G sensitivity function memory 19g, and the B sensitivity function memory 19b.

In addition, the X-Y stage 2, the field angle setting circuit 21, the color filter driver 9 for controlling the rotary color filter 8, the CMD driver 11 for controlling the CMD 10, the FPN memory 15, the switching circuit 18, and the address controller 20 are connected to the controller 22.

The measurement of the sensitivity function H on the basis of the above arrangement will be described below.

The measurement is performed for each of R, G, and B color images in units of field angles.

In this case, as described above, the sensitivity function H is an transformation operator from a continuous system to a discrete system, and the number of columns of the sensitivity function H is infinite. The measurement is, however, impossible in practice. Assuming that the number of columns of the sensitivity function H is set to be $\underline{n}$, the measurement is performed, and necessary positions are calculated by interpolatory calculation as will be described later.

In the sensitivity function H, as shown in FIG. 4, a sensitivity distribution of each observation image position is arranged in a row direction, and a sensitivity distribution of each observation image position is arranged in a column direction.

The sensitivity function is obtained by performing an image pickup operation at each observation image position while the illumination light source 1 is shifted.

In order to perform a practical operation of a sensitivity function measuring means, after the rotary color filter 8 is set to be R by the color filter driver 9, the field stop 3 is adjusted under the control of the stop driver 6 such that a field angle is set to be $\theta$max (corresponding to FIG. 5A) by the field angle setting circuit 21, and the liquid crystal lens 5 is adjusted under the control of the liquid crystal lens driver 7.

The entire field of the original image is equally divided by $\underline{n}$ positions (x1, x2, ..., xn), and the illumination light source 1 is moved to the position x1 on the original image by driving the X-Y stage 2 to perform an image pickup operation by the CMD 10.

Setting of a field angle performed by the field stop 3 and the liquid crystal lens 5 will be described below with reference to FIGS. 5A and 5B.

According to the present invention, as described above, electronic zooming can be performed without specially changing a field angle according to equation (6). However, the accuracy of reproduction can be improved by inputting only the beam of an image to be photographed and to be reproduced as much as possible. For this purpose, the field angle setting circuit 21 is arranged.

More specifically, FIG. 5A shows a case corresponding to a wide-angle lens. In this case, the field stop 3 is widely open, and the refractive index of the liquid crystal lens 5 is controlled to increase a refracting power.

In contrast to this, FIG. 5B shows a case corresponding to a telephoto lens. In this case, the field stop 3 is narrow, and the refractive index of the liquid crystal lens 5 is controlled to decrease a refracting power.

That is, in a telephoto mode, when the refractive index of the liquid crystal lens 5 is equal to that of the liquid crystal lens 5 in FIG. 5A, the beam of an image to be photographed is incident on only a part of the image pickup element. However, when the refractive index is decreased as shown in FIG. 5B, the beam of the image can be incident on the entire image pickup element without any waste.

In addition, a field angle can easily be changed by using the field stop 3 and the liquid crystal lens 5.

The field angle can be changed every predetermined field angle (to be referred to as iint hereinafter) within a range of $\theta$min to $\theta$max which can be set by the field angle setting circuit 21 through the controller 22.

An image signal obtained by picking up the image of the pixel $\underline{i}$ of the CMD 10 is a sensitivity distribution $h_i(x1)$, the image signal is amplified by the preamplifier 12, converted into a digital signal by the A/D converter 13, and then written in the first column of each row of the sensitivity function memory 16 as a sensitivity distribution signal, i.e., sensitivity function data, obtained by causing the subtractor 14 to subtract the fixed pattern noise of the CMD stored in the FPN memory 15.

The illumination light source 1 is moved to the position x2, the same processing as described above is performed, and the resultant sensitivity function data is written at a position corresponding to the second column of each row of the sensitivity function memory 6.

The same processing as described above is repeated until the illumination light source 1 reaches the position xn, sensitivity function data of each position is written in a corresponding one of columns of the sensitivity function memory 16.

The amount of each data of the sensitivity function memory 16 is compressed by the data compressor 17, and the compressed data is stored in the R sensitivity function memory 19r as sensitivity function data Himax.

The field angle is decreased by iint, and the same processing as described above is performed to obtain sensitivity function data Himax-int. This sensitivity function data is stored in the R sensitivity function memory 19r.

Sensitivity function data of all the fields having field angles which are different from each other by iint are stored, and the same processing as described above is repeated until the field angle is set to be imin finally.

Note that, in detection, an image pickup operation of the field is performed at the n positions equally dividing the original image within the range of predetermined positions x1 to xn.

In this manner, all the sensitivity function data for an R image are stored, and sensitivity function data for G and B images can be obtained by the same manner as described above. The sensitivity function data are stored in the G sensitivity function memory 19g and the B sensitivity function memory 19b, respectively, thereby completely storing the sensitivity function data.

An image pickup apparatus including an image reproducing means for reproducing an image from the image pickup element by using the sensitivity function data obtained by the measurement will be described below.

Figure 2:
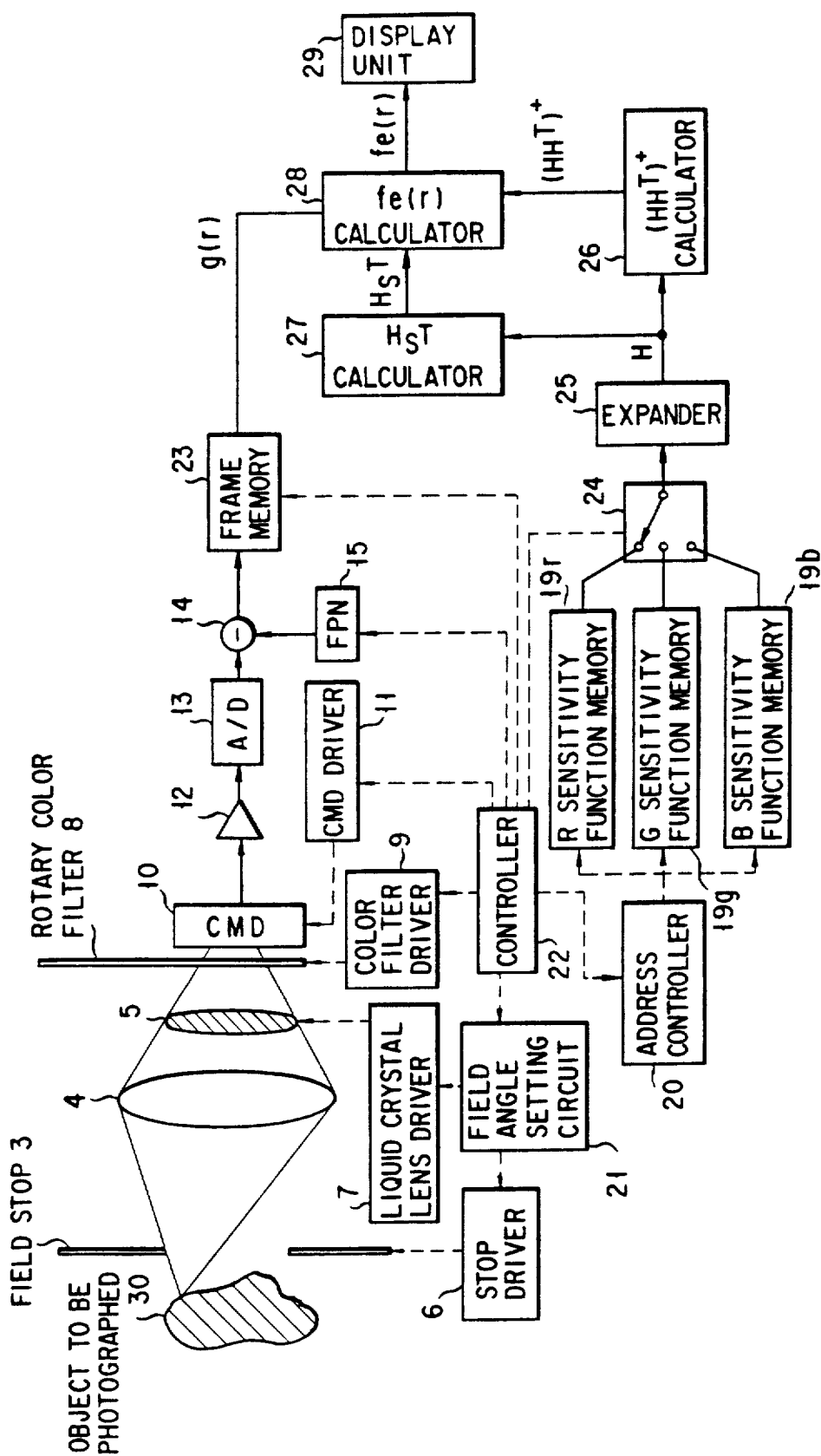
FIG. 2 is a view showing the arrangement of an image reproducing means according to the first embodiment of the present invention.

FIG. 2 is a view showing an arrangement of an image pickup apparatus according to the first embodiment. The image pickup apparatus comprises an image reproducing means in which a method of reproducing an image is applied to so-called zooming by using the sensitivity function data obtained by the sensitivity function measuring means.

The same reference numerals as in FIG. 1 denote the same parts in FIG. 2, and a detailed description thereof will be omitted.

In FIG. 2, a frame memory 23 for storing image data is connected to the subtractor 14 of the sensitivity function measuring means in FIG. 1.

The R sensitivity function memory 19r, the G sensitivity function memory 19g, and the B sensitivity function memory 19b are connected to the data compressor 17 through the switching circuit 18 in FIG. 1. These sensitivity function memories 19r, 19g, and 19b are connected to only the address controller 20 in FIG. 2.

As described above, the sensitivity function data of the R, G, and B images are stored in the memories 19r, 19g, and 19b, respectively, and a switching circuit 24 for selecting the outputs of the memories 19r, 19g, and 19b is connected to only the controller 22.

The switching circuit 24 serving as an image reproducing means is connected to an $(HH^T)+$ calculator 26 and an $H_S^T$ calculator 27 through a data expander 25.

In addition, in order to calculate reproduced image data by the image data and calculation outputs from the calculators, the calculators 26 and 27 and the frame memory 23 are connected to an fe(r) calculator 28.

A display unit 29 for displaying the reproduced image of an object 30 to be photographed which is present on the front surface of the liquid crystal lens 5 through the field stop 3 is connected to the fe(r) calculator 28.

An operation of the image reproducing apparatus on the basis of the above arrangement will be described below.

When the image of the object 30 begins to be picked up, the field stop 3 and the liquid crystal lens 5 are adjusted by the field angle setting circuit 21 through the controller 22 such that a desired field angle $\theta$ is obtained.

An exposure period of the CMD 10 is set by a photometric system (not shown), and the rotary filter 8 is set to be R by the color filter driver 9 through the controller 22.

An image signal obtained by causing the CMD 10 to pick up the object 30 through the optical systems 3, 4, and 5 is amplified by the preamplifier 12, converted into a digital signal by the A/D converter 13, and stored in the frame memory 23 as image data g(r) after an FPN is subtracted by the subtractor 14.

Sensitivity function data H corresponding to the field angle $\theta$ is read out from the R sensitivity function memory 19r by the address controller 20, and is input to the data expander 25 through the switching circuit 24. The sensitivity function data H is decoded by the data expander 25, and is input to the $(HH^T)+$ calculator 26 and the $H_S^T$ calculator 27.

Each component of $HH^T$ is calculated in the $(HH^T)+$ calculator 26 according to equation (7), and $(HH^T)+$ is then calculated.

In the $H_S^T$ calculator 27, s elements for display are calculated from a sensitivity distribution hi(r) consisting of n elements by interpolatory calculation. These s elements are transposed to obtain $H_S^T$, and $H_S^T$ is input to the fe(r) calculator 28.

In the f(r) calculator 28, the reproduced image data fe(r) of an R image is calculated on the basis of g(r) input from the frame memory 23, $(HH^T)+$ input from the $(HH^T)+$ calculator 26, and $H_S^T$ input from the $H_S^T$ calculator 27, and the reproduced image data fe(r) is output to the display unit 29.

After the reproduced image data of G and B images are calculated in the same manner as described above, the reproduced image data are output to the display unit 29 to be displayed.

When the field angle is set to be a different value, sensitivity function data corresponding to the field angle is read out from each of the sensitivity function memories 19r, 19g, and 19b, and the same processing as described above is performed.

As described above, according to this embodiment, when a photographic lens has aberrations or focusing errors, an original image can be reproduced by a sensitivity function without measuring a PSF. For this reason, the present invention can be utilized in automatic focusing without using a large number of lenses.

At this time, the liquid crystal lens is used as part of the optical system, and the optical path of the liquid crystal lens is changed such that the beam of the object to be photographed is incident on the entire image pickup element without any waste. In addition, when the field stop is driven in accordance with the change in optical path, the accuracy of a reproduced image can be improved.

In this embodiment, since sensitivity function data is compressed and stored, a storage capacity for the sensitivity function data can be decreased.

In addition, in this embodiment, since an original image is reproduced by using sensitivity function data of the three primary colors, i.e., RGB, a color image can be properly reproduced.

In this embodiment, the number of pixels of a displayed image can be easily changed by changing $H_S^T$.

In this embodiment, even when the image pickup element has defective pixels, an original image can be correctly reproduced.

In this embodiment, an image is reproduced by using all the pixels of the CMD 10. According to the present invention, when the sensitivity function data H is obtained, the number of pixels of the image pickup element or the positions of the pixels are not limited. An image can be correctly reproduced by, e.g., random sampling using an arbitrary number of pixels.

In this embodiment, although the sensitivity function data H is stored, $H_S^T(HH^T)+$ may be calculated during storage of the sensitivity function data and stored.

In this embodiment, the illumination light source is driven in measuring a sensitivity function. However, the illumination light source may be fixed, and the image pickup unit constituted by a CMD and lens systems may be driven.

Figure 6:
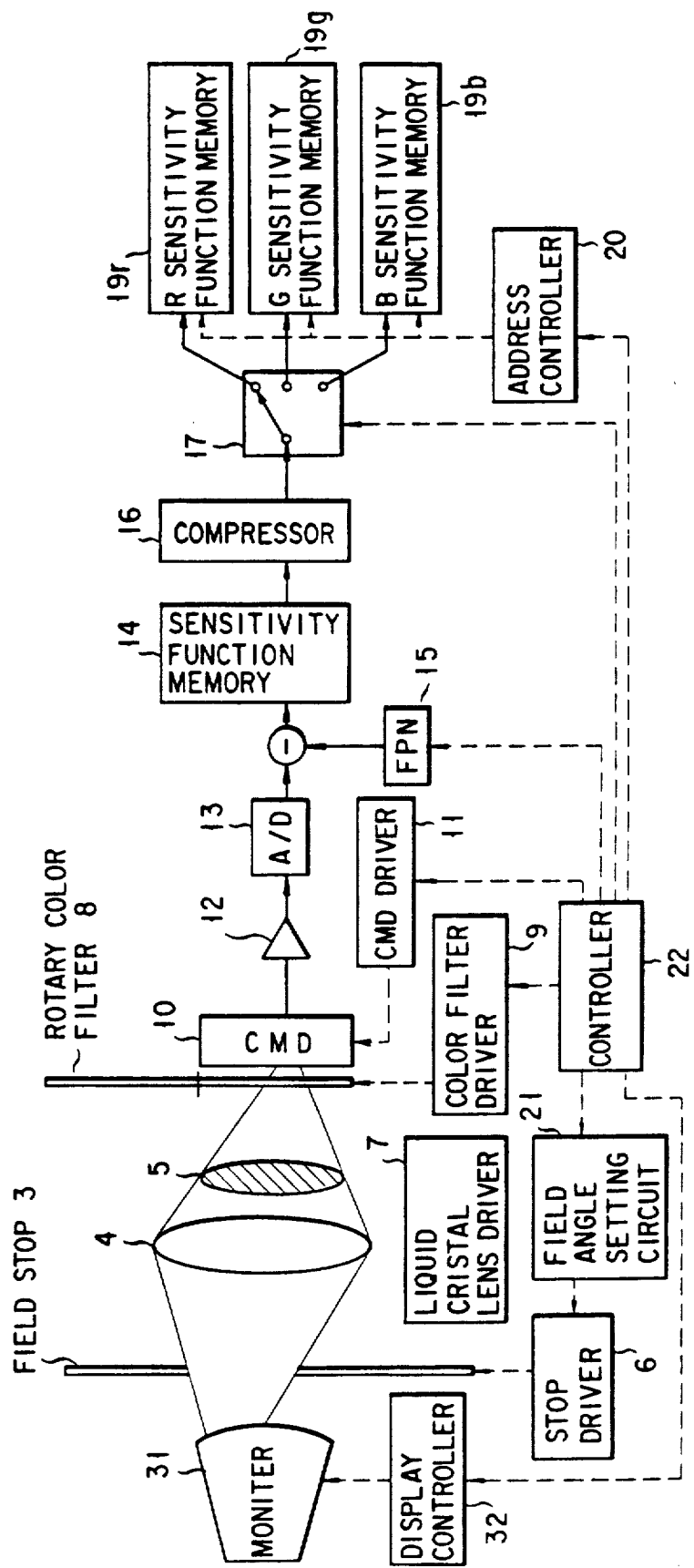
FIG. 6 is a view showing the arrangement of a modification of the sensitivity function measuring means according to the first embodiment of the present invention.

In addition, in the sensitivity function storing means, as shown in FIG. 6, a point corresponding to the illumination light source may be sequentially moved and displayed by a monitor 31 and a display controller 32 to measure the sensitivity function.

Figure 7A:
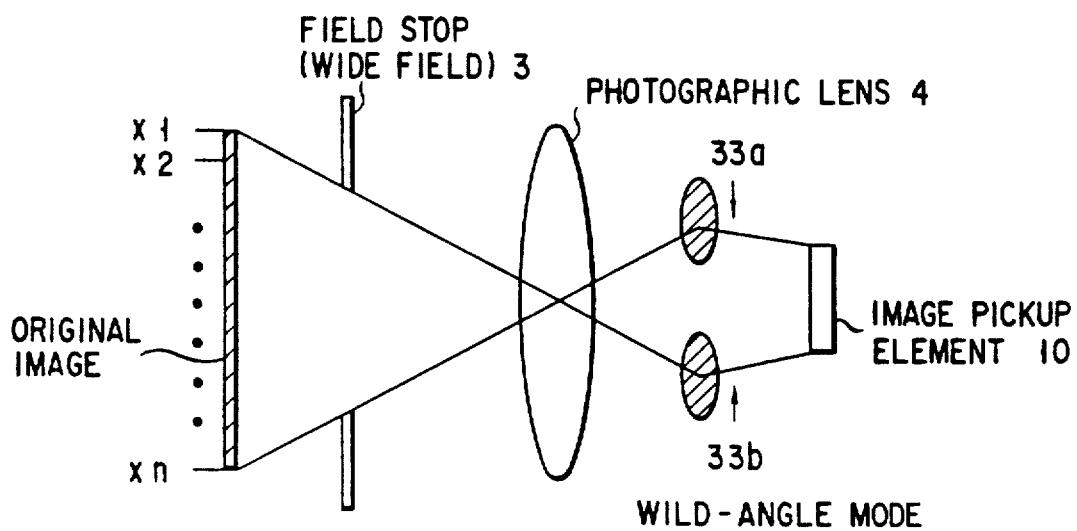
FIGS. 7A and 7B are views showing modifications of the image setting mechanism according to the first embodiment of the present invention.
Figure 7B:
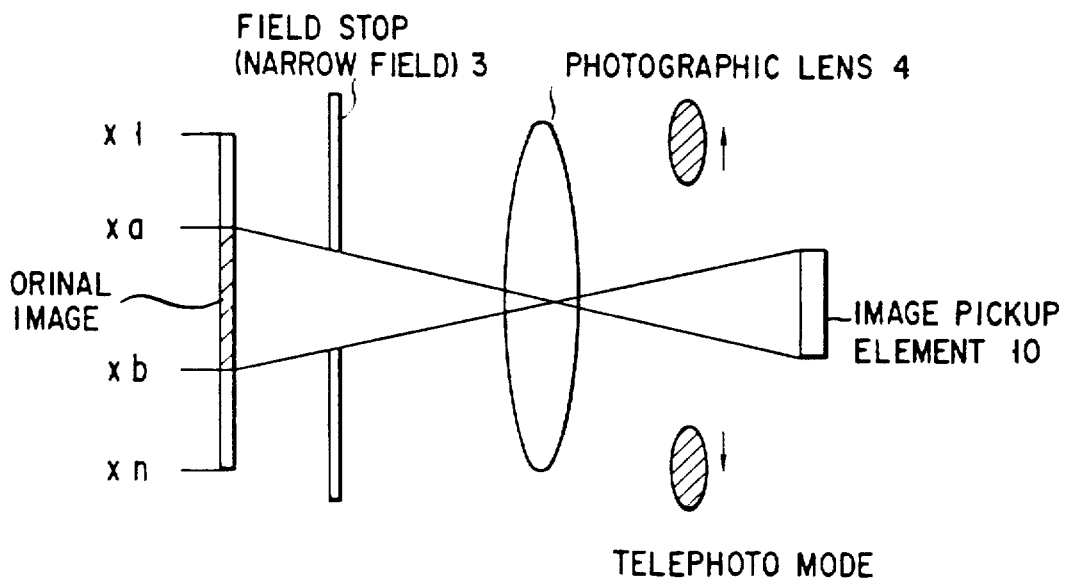

Although an optical path is changed using the liquid crystal lens in zooming, as shown in FIGS. 7A and 7B, a plurality of lenses 33a and 33b may be moved.

FIGS. 7A and 7B show a wide-angle image pickup mode and a telephoto image pickup mode, respectively, and have a relationship corresponding to the relationship between FIGS. 5A and 5B.

Several embodiments different from the first embodiment will be described below.

In the above first embodiment, as shown in FIG. 3, the measurement of data related to sensitivity and the reproduction of a picked image are performed under the condition that a distance between an original image and a photographic lens of an optical system is kept constant.

In practice, the sensitivity function is, however, changed in accordance with the distance between the photographic lens and the original image. Therefore, the sensitivity function in accordance with the distance must be measured, and the original image must be reproduced on the basis of the sensitivity function.

The second embodiment on the basis of the above principle will be described below with reference to FIGS. 8 to 10.

Note that the same reference numerals as in the first embodiment denote the same parts in the second embodiment.

FIG. 8 is a view showing an arrangement for forming sensitivity functions and reproducing filters according to the second embodiment of the present invention.

Figure 9A:
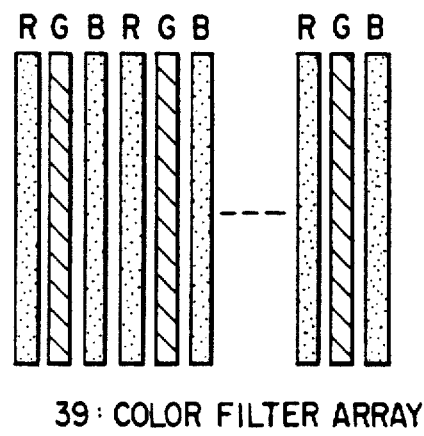
FIG. 9A is a view showing a color filter array used in the second embodiment of the present invention.

The embodiment in FIG. 8 is different from the embodiment shown in FIG. 1 in the following points. That is, a stripe type color filter array 39 shown in FIG. 9A is used in place of a rotary color filter to obtain a color signal, and reproducing filters are formed in accordance with a distance Di between a illumination light source 1 and a photographic lens 4.

In FIG. 8, reference numeral 34 denotes a distance measuring unit (AF sensor), and the distance measuring unit 34 measures the distance Di.

Reference numeral 35 denotes a color separation circuit. In the color separation circuit 35, a color signal obtained by an image pickup operation using the color filter array 39 is separated into R, G, and B color signals, and the R, G, and B signals are output to R, G, and B sensitivity function memories 16r, 16g, and 16b, respectively.

Figure 9B:
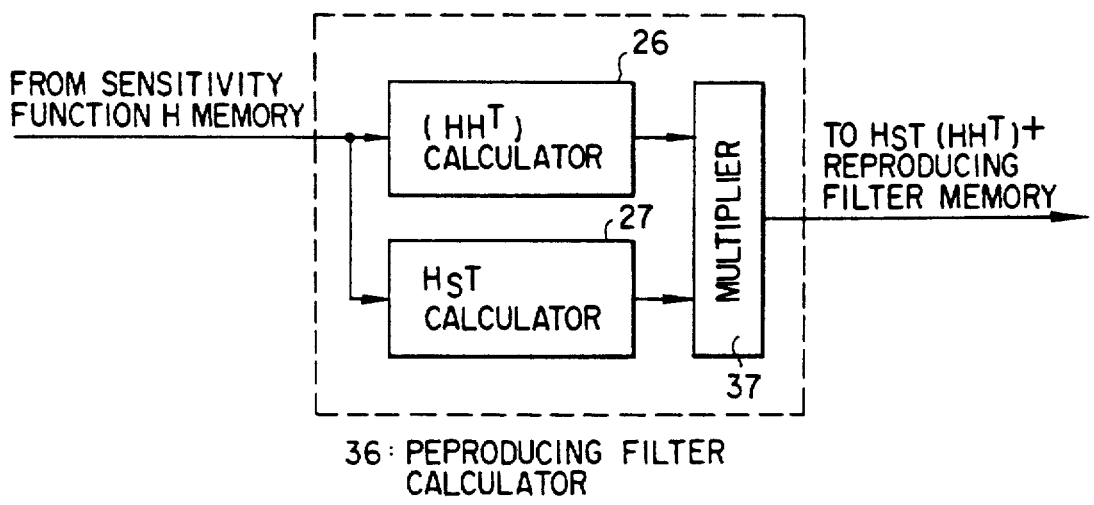
FIG. 9B is a view showing the arrangement of a reproducing filter used in the second embodiment.

Reference numerals 36r, 36g, and 36b denote reproducing filter calculators. As shown in FIG. 9B, each of the reproducing filter calculators is constituted by an $(HH^T)+$ calculator 26, an $H_S^T$ calculator 27, and a multiplier 37, thereby calculating a reproducing filter, i.e., $H_S^T(HH^T)+$.

Reference numerals 38r, 38g, and 38b denote memories for storing the reproducing filters calculated for R, G, and B data, respectively. Each of the memories is arranged such that the reproducing filter is written at an address corresponding to the distance Di. The distance between the illumination light source and the photographic lens 4 is changed by an X-Y stage 2, the distance Di is measured by the distance measuring unit 34 (AF sensor), and each calculated reproducing filter is written in a corresponding one of the reproducing filter memories. The distance Di is selected from distances $D_1$ to $D_I$ ranging from, e.g., a closest focusing distance to a distance (x).

Figure 10:
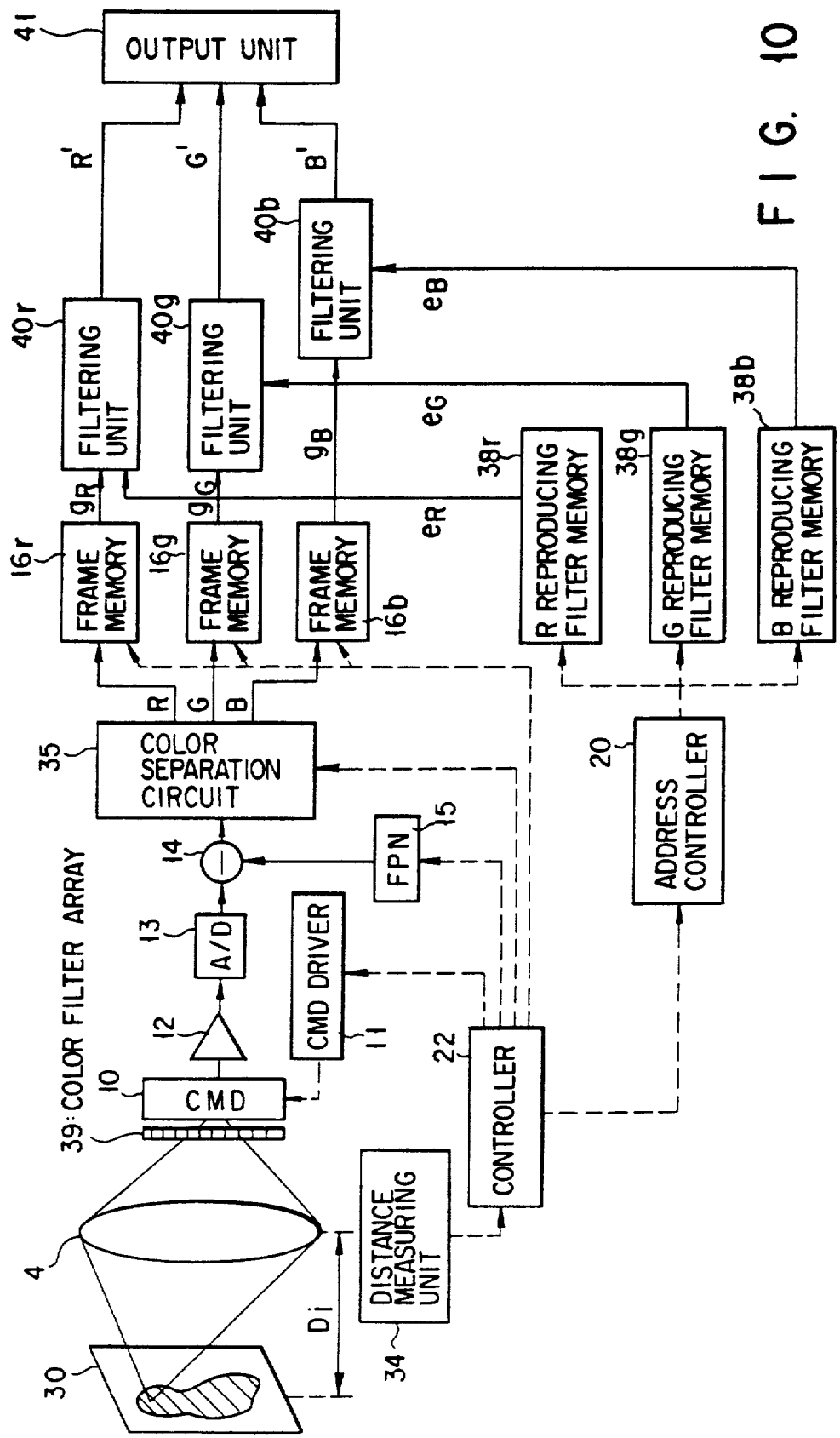
FIG. 10 is a view showing the arrangement of an image reproducing circuit according to the second embodiment of the present invention.

FIG. 10 shows an image reproducing circuit.

In FIG. 10, reference numerals 40r, 40g, and 40b denote filtering units, and the filtering units 40r, 40g, and 40b calculate reproduced image data R', G', and B' on the basis of image data $g_R$, $g_G$, and $g_B$ from the R, G, and B frame memories 16r, 16g, and 16b in accordance with the following equations:

$$R' = e_R g_R \quad (8)$$

$$G' = e_G g_G \quad (8')$$

$$B' = e_B g_B \quad (8'')$$

In equations (8), (8'), and (8''), $e_R$, $e_G$, and $e_B$ are $n \times m$ matrices (where, $\underline{n}$ is the number of measured sensitivity functions, and $\underline{m}$ is the number of pixels of a CMD), and $g_R$, $g_G$, and $g_B$ are $m \times 1$ matrices.

In FIG. 10, reference numeral 41 denotes an output unit such as a CRT or a video printer.

An operation of reproduction processing will be described below.

After the image signal of an object 30 to be photographed picked up by a CMD 10 in an appropriate exposure amount is converted into a digital signal by an A/D converter 13 through a preamplifier 12, and the image signal is separated into R, G, and B data by a color separation circuit 35. The R, G, and B data are stored in the frame memories 16r, 16g, and 16b, respectively.

A distance Di between a photographic lens 4 and the object 30 is measured by the operation of a distance measuring unit 34, and an address controller 20 reads out reproducing filters $e_R$, $e_G$, and $e_B$ corresponding to the distance Di from reproducing filter memories 38r, 38g, and 38b, respectively.

The reproducing signals R', G', and B' obtained by causing the filtering units 40r, 40g, and 40b to calculate equations (8), (8') and (8'') are output to the output unit 41, thereby displaying an image on a CRT or the like.

According to the second embodiment arranged as described above, reproducing filters are designed for each distance Di, and reproducing filters are selected in accordance with the distance between the object and the photographic lens during reproduction processing. For this reason, even when the distance between the object and the photographic lens is changed, appropriate reproduction processing can be performed.

In addition, in the second embodiment, the color filter array is used in place of a rotary color filter. A rotary color filter and a driving unit therefor are not required.

The color filter array is not limited to a stripe type color filter array, and an appropriate color filter array such as a mosaic type or check type color filter array may be used.

According to the second embodiment, although a field angle is not changed, the field angle may be changed as in the first embodiment.

In the second embodiment, the distance measuring unit (AF sensor) for measuring the distance Di between the object and the photographic lens during reproduction processing is required.

In the third embodiment, as will be described later, a distance measuring unit (AF sensor) is not used to decrease the size and weight of an image pickup unit.

Figure 11:
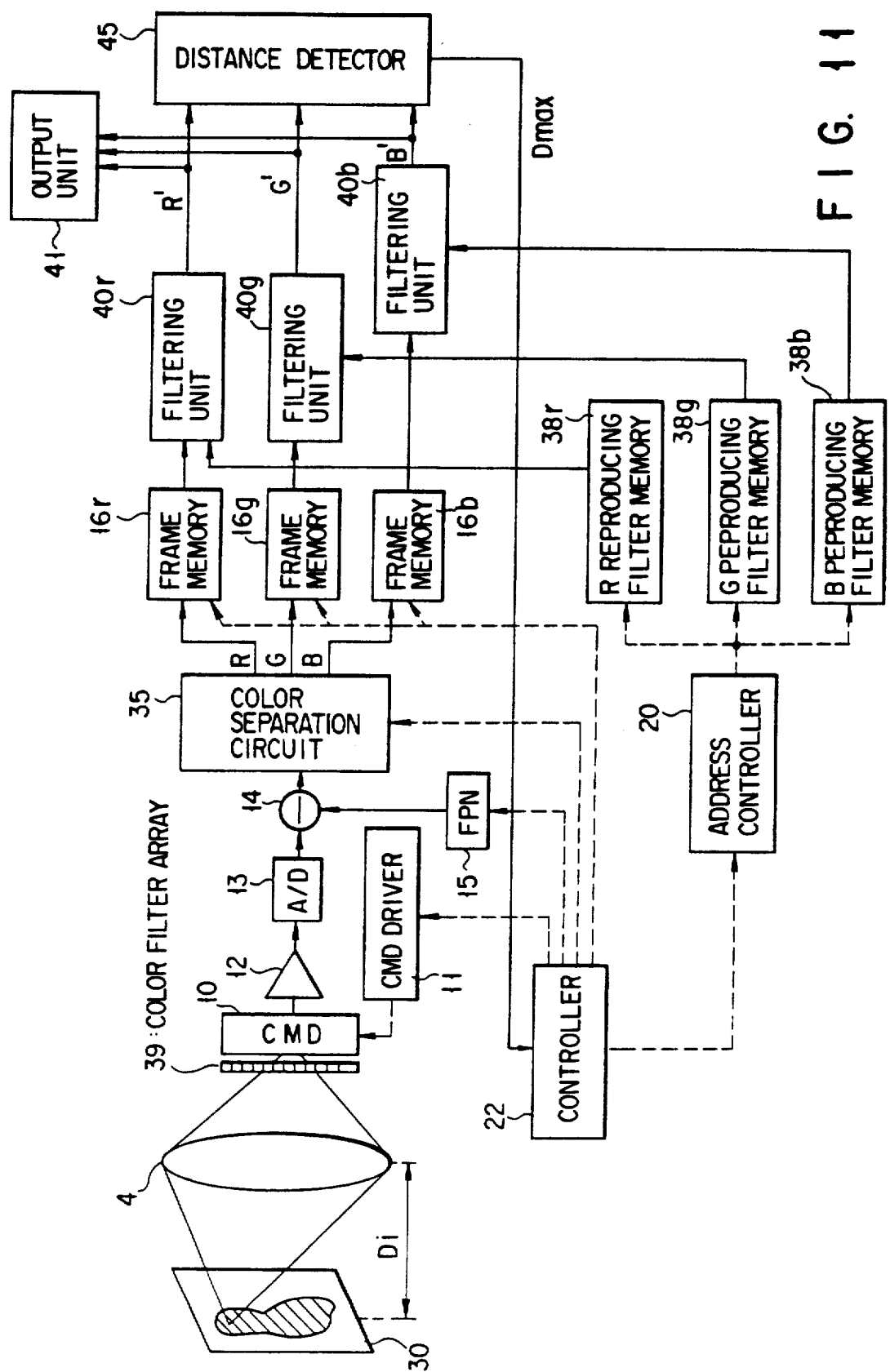
FIG. 11 is a view showing the arrangement of a reproduction processing circuit according to the third embodiment of the present invention.

FIG. 11 is a view showing the arrangement of a reproduction processing circuit according to the third embodiment.

Figure 12A:
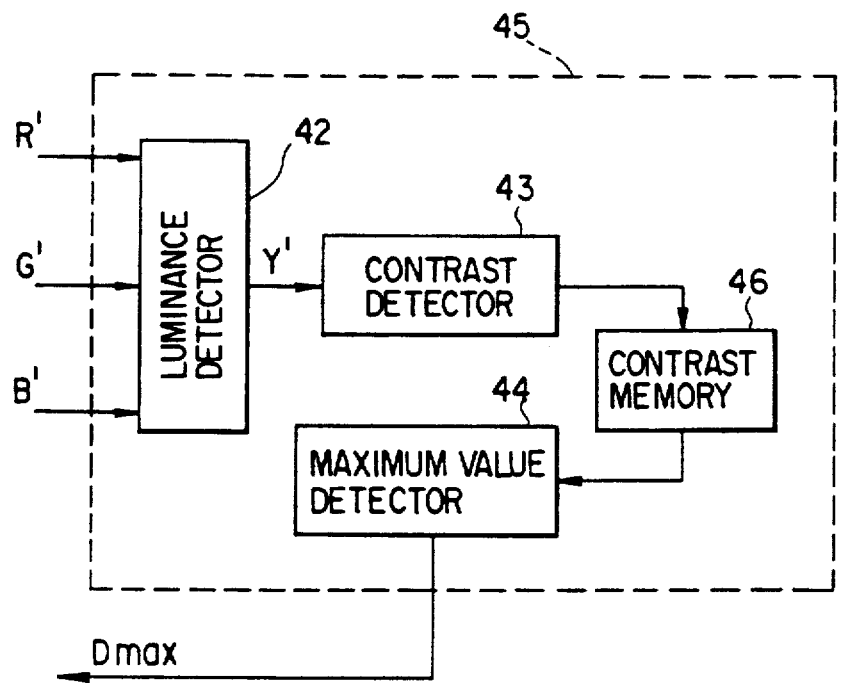
FIG. 12A is a view showing the arrangement of a distance detecting unit used in the third embodiment of the present invention.
Figure 12B:
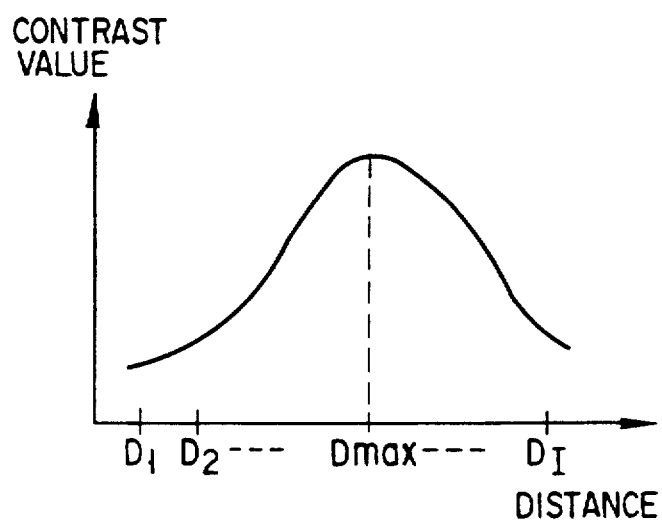
FIG. 12B is a graph for explaining that distance data capable of obtaining a maximum contrast value is output from the distance detecting unit used in the third embodiment of the present invention.

In FIG. 11, reference numeral 45 denotes a distance measuring unit. As shown in FIG. 12, the distance detector 45 is constituted by a luminance detector 42 for detecting luminance data Y' from reproducing data R', G', and B', a contrast detector 43 for detecting the contrast of an image from the luminance data Y' by using a band-pass filter or the like, a contrast memory 46 for storing a contrast value from the contrast detector 43, and a maximum value detector 44 for detecting the maximum value of the contrast value.

An operation of the third embodiment will be described below.

A signal obtained by picking up the image of an object to be photographed as in the second embodiment is subjected to color separation, and the separated data are stored in frame memories 16r, 16g, and 16b, respectively.

Reproducing filters corresponding to a distance $D_1$ between an object and a photographic lens are read out from reproducing filter memories 38r, 38g, and 38b by an address controller 20 through a controller 22, and reproducing signals R', G', and B' are obtained by filtering units 40r, 40g, and 40b, respectively.

Luminance data Y' is obtained by the luminance detector 42, and a contrast value is obtained by the contrast detector 43. The contrast value is written at a position corresponding to the distance $D_1$ in the contrast memory 46.

Reproducing filters corresponding to a distance $D_2$ between the object and the photographic lens are read out from the reproducing filter memories, and a contrast value is obtained in the same manner as described above. The value is written at a predetermined position.

The above processing is repeated up to a distance $D_j$ between the object and the photographic lens, and a contrast value corresponding to each distance is obtained.

In the maximum value detector 44, a distance Dmax (FIG. 12B) having a maximum contrast value is output to the controller 22. Reproducing filters corresponding to the distance Dmax are read out from the reproducing filter memories 38r, 38g, and 38b, and reproduction processing is performed by each of the filtering units 40r, 40g, and 40b, thereby outputting reproduced data R', G', and B' to an output unit 41.

As described above, according to the third embodiment, reproducing filters each having the maximum contrast value are selected, and reproduction processing is performed. For this reason, an in-focus image can be obtained independently of the distance between the object and the photographic lens According to the third embodiment, a distance measuring unit (AF sensor) is not required, and the photographic lens need not be moved. Therefore, a lightweight, compact image pickup unit can be provided.

According to the third embodiment, in detection of contrast by the contrast detector 43, the range and position of the contrast can be freely set, so that an in-focus position can be designated after a photographic operation is performed.

In the third embodiment, reproducing filters are selected in an order of distances under the control of the controller. However, for example, the following arrangement may be used. That is, a knob (not shown) for changing a read position of a reproducing filter memory may be arranged, and an observer may operate this knob to select an image to be output while observing a reproduced image on the screen of the output unit 41.

In the above embodiment, an image on the whole screen is reproduced, and an m×m generalized inverse matrix is calculated by an $(HH^T)+$ calculator.

Since m is generally about $500^2 = 250,000$, calculation is considerably complicated to obtain the generalized inverse matrix of $HH^T$. For this reason, a screen may be divided into a large number of areas, a reproducing filter may be designed for each of the divided areas, and the number of degrees of $HH^T$ may be decreased. In this manner, the generalized inverse matrix can easily be obtained.

In the fourth embodiment, a case wherein a method of dividing a screen is employed will be described below.

In this case, as shown in FIG. 13A, the screen is divided into 4×4=16 areas.

FIG. 14 is a view showing the arrangement of a main part of a reproducing filter calculating circuit for each of the divided areas according to the fourth embodiment.

In FIG. 14, reference numeral 50 denotes a controller for write/read access to memories. In the fourth embodiment, sensitivity functions are measured in the same manner as in each of the above embodiments.

In reproducing filter calculators 47r, 47g, and 47b, reproducing filters are calculated by using a sensitivity function corresponding to each of the divided areas. The reproducing filters are written in divided reproducing filter memories 48r, 48g, and 48b.

Figure 15:
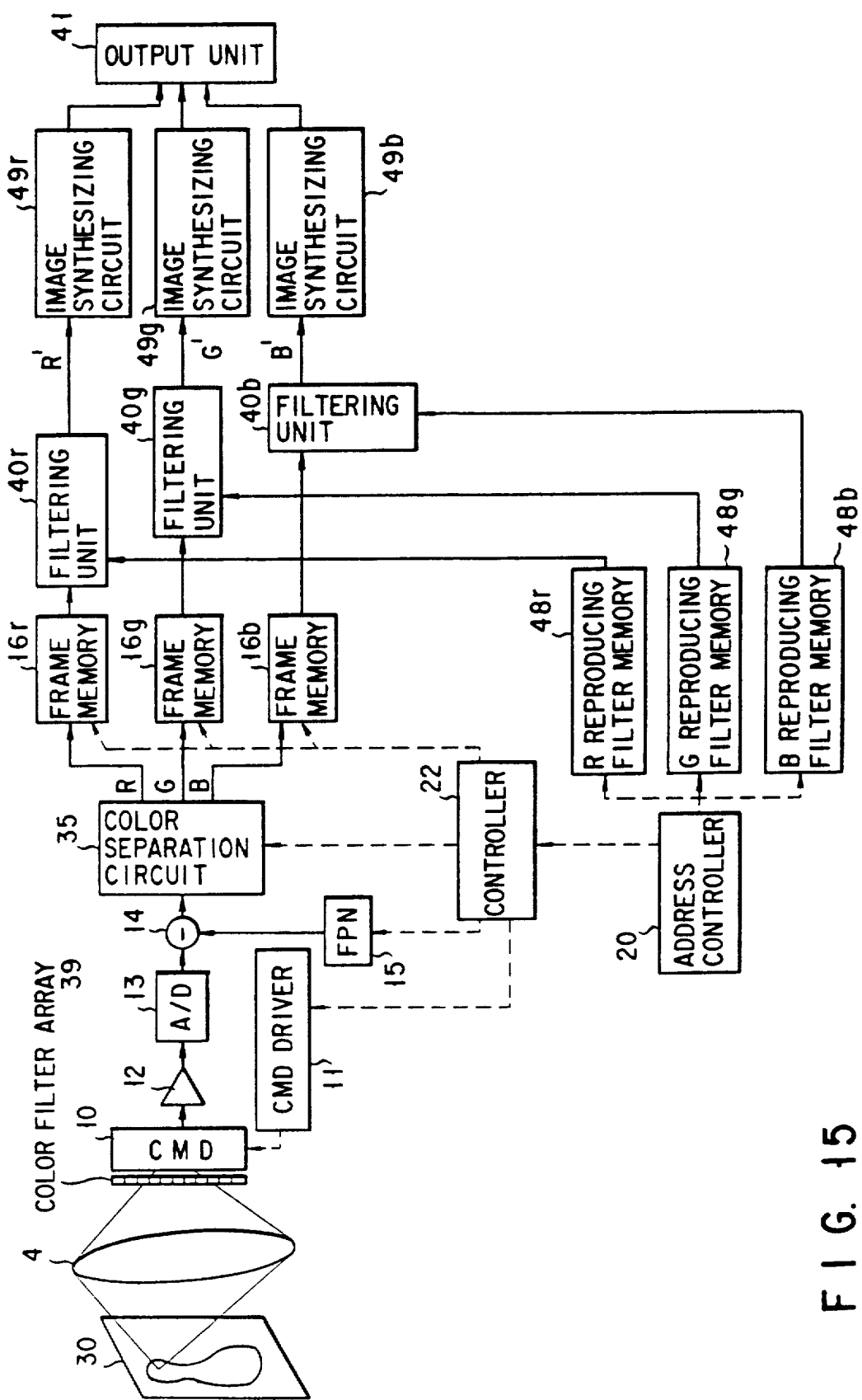
FIG. 15 is a view showing the arrangement of a reproduction processing circuit according to the fourth embodiment of the present invention.

FIG. 15 is a view showing the arrangement of a reproduction processing circuit according to the fourth embodiment.

As the characteristic feature of the fourth embodiment, divided reproducing filters corresponding to each of the divided areas are read out from the divided reproducing filter memories 48r, 48g, and 48r, reproduction processing is performed by filtering units 40r, 40g, and 40b, and the divided area images which are reproduced are synthesized by image synthesizing circuits 49r, 49g, and 49b, thereby reproducing the image of the whole screen.

According to the fourth embodiment, as the number of divided areas is decreased, the number of degrees of the matrix of $HH^T$ is decreased. For this reason, the matrix can easily be calculated, and the calculation period of reproducing filters can be shortened.

When the screen is divided into divided areas such that each of the divided areas has an overlapping area therebetween as shown in FIG. 13B, synthesized images can be prevented from being discontinuously connected to each other.

In addition, when a conventional sequential solution is used in place of the calculation of an inverse matrix, the above effect as described above can be obtained.

As described above, according to the present invention, sensitivity function data of each position of an image pickup element is properly stored, and an original image can be analytically, correctly reproduced as a continuous image by using the sensitivity function data of each position of the image pickup element with out being influenced by an optical system.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An image pickup apparatus comprising:
    a photographic optical system directed to an object to be photographed;
    image pickup means for outputting image data corresponding to an image of said object which is incident through said photographic optical system;
    sensitivity function storing means for prestoring sensitivity function data representing a light sensitivity in an object space at each pixel included in said image pickup means; and
    image reproducing means for reproducing the image data output from said image pickup means by using the sensitivity function data stored in said sensitivity function storing means.

2. An apparatus according to claim 1, wherein said sensitivity function storing means includes a red sensitivity function memory, a green sensitivity function memory, and a blue sensitivity function memory for three primary colors.

3. An apparatus according to claim 1, wherein said photographic optical system includes field angle setting means for a zooming application.

4. An apparatus according to claim 3, wherein said field angle setting means includes a liquid crystal lens having a refractive index controlled in accordance with a set field angle to change an optical path.

5. An apparatus according to claim 3, wherein said field angle setting means includes a plurality of lenses moved in accordance with a set field angle to change an optical path.

* * * * *